US012737451B2

(12) United States Patent
Seletskiy et al.

(10) Patent No.: US 12,737,451 B2

(45) Date of Patent: Sep. 15, 2026

(54) SYSTEMS AND METHODS FOR MIGRATING CODE UNITS AND DATA UNITS BETWEEN VIRTUAL MEMORY REGIONS

(71) Applicant: Cloud Linux Software Inc., Estero, FL (US)

(72) Inventors: Igor Seletskiy, Palo Alto, CA (US); Pavel Iovevski, Minsk (BY)

(73) Assignee: Cloud Linux Software Inc., Estero, FL (US)

( * ) Notice: Subject to any disclaimer, the term of this patent is extended or adjusted under 35 U.S.C. 154(b) by 156 days.

(21) Appl. No.: 18/935,825

(22) Filed: Nov. 4, 2024

(65) Prior Publication Data

US 2026/0127267 A1 May 7, 2026

(51) Int. Cl.
*G06F 21/54* (2013.01)
*G06F 21/55* (2013.01)

(52) U.S. Cl.
CPC ............ *G06F 21/54* (2013.01); *G06F 21/552* (2013.01)

(58) Field of Classification Search
CPC ............................... G06F 21/54; G06F 21/552
See application file for complete search history.

(56) References Cited

U.S. PATENT DOCUMENTS 9,405,708 B1 * 8/2016 Pohlack .................. G06F 21/54
10,417,121 B1 * 9/2019 Suhas ..................... G06F 12/02
2008/0301468 A1 * 12/2008 Murase ................... G06F 21/79 713/193
2015/0047049 A1 * 2/2015 Panchenko ............. G06F 21/14 726/26
2015/0186296 A1 * 7/2015 Guidry .................... G06F 21/54 713/193
2015/0334126 A1 * 11/2015 Mooring ............. G06F 9/45545 726/1

(Continued)

FOREIGN PATENT DOCUMENTS

CN 110990122 A * 4/2020 ......... G06F 9/45558
CN 119917209 A * 5/2025
EP 3660715 A1 * 6/2020 ......... G06F 21/6245

OTHER PUBLICATIONS

Vilanova et al, ( CODOMs: protecting software with code-centric memory domains; ACM SIGARCHyear Computer Architecture News, vol. 42, Issue 3, pp. 469-48, 2014) (Year: 2014).*

(Continued)

*Primary Examiner* — Sher A Khan

(74) *Attorney, Agent, or Firm* — ArentFox Schiff LLP; Michael Fainberg

(57) ABSTRACT

Disclosed herein are systems and method for migrating units of a program between virtual memory regions. A method includes: dividing system virtual memory into a set of virtual memory regions; storing (1) program code including instructions in a set of code units and (2) program variables and data values in a set of data units, wherein the set of code units and the set of data units are spread across the set of virtual memory regions; in response to detecting that a trigger condition of a first security policy is satisfied, executing a transfer action of the first security policy that transfers a code unit and/or data unit from an origin virtual memory region to a destination virtual memory region.

19 Claims, 5 Drawing Sheets

(56) References Cited

U.S. PATENT DOCUMENTS

| | | | | |
|---|---|---|---|---|
| 2016/0253497 | A1* | 9/2016 | Christodorescu | G06F 21/566<br>726/23 |
| 2016/0274934 | A1* | 9/2016 | Nelson | G06F 9/45558 |
| 2017/0076072 | A1* | 3/2017 | Koren | G06F 21/105 |
| 2019/0044973 | A1* | 2/2019 | Deutsch | H04L 63/1466 |
| 2020/0019703 | A1* | 1/2020 | Saldanha | G06F 12/145 |
| 2021/0019172 | A1* | 1/2021 | Patel | G06F 9/45558 |
| 2021/0243208 | A1* | 8/2021 | Rubin | G06F 21/554 |
| 2022/0077885 | A1* | 3/2022 | Dicks | H04W 4/021 |
| 2022/0261153 | A1* | 8/2022 | Papa | G06F 12/0246 |
| 2024/0272820 | A1* | 8/2024 | Papa | G06F 12/0246 |
| 2024/0354404 | A1* | 10/2024 | Mulligan | G06F 21/552 |

OTHER PUBLICATIONS

X. Chen, H. Bos and C. Giuffrida, “CodeArmor: Virtualizing the Code Space to Counter Disclosure Attacks,” 2017 IEEE European Symposium on Security and Privacy (EuroS&P), Paris, France, 2017, pp. 514-529, (Year: 2017).*

* cited by examiner

SYSTEMS AND METHODS FOR MIGRATING CODE UNITS AND DATA UNITS BETWEEN VIRTUAL MEMORY REGIONS

FIELD OF TECHNOLOGY

The present disclosure relates to the field of cybersecurity, and, more specifically, to systems and methods for enhancing security through the dynamic migration of code and data units between different virtual memory regions within a working system.

BACKGROUND

Conventional virtual memory management techniques rely on static allocation methods, which can lead to suboptimal virtual memory resource utilization. Due to program imperfection, code and data unit addresses may also be left exposed. Therefore, it is possible to implement a cyberattack by retrieving some initial data (e.g., a program image, loading metadata, etc.) and the algorithm for loading said data into virtual memory, and restoring the structure of a program.

Modern well-known mechanisms for protecting programs from this type of attack may require determining a certain random offset value by which the original program image is shifted. However, the virtual memory locations remain static throughout the execution of the program in these mechanisms. In the case of a compromise (e.g., unauthorized access or manipulation) of a program's virtual memory area(s), it is possible to recover the information about a loaded program image and shared libraries and its structure if its continuous operation time has a long period. Thus, the program remains vulnerable to the attack based on the knowledge of the data positions and code.

SUMMARY

The present disclosure introduces a novel security mechanism that enhances system resilience through the dynamic migration of code units (e.g., executable instructions) and data units (e.g., variables, data structures) between virtual memory regions within a working system. By relocating these units, dynamic migration helps to obscure virtual memory patterns and prevent attackers from reliably targeting specific virtual memory locations. As a result, the disclosed systems and methods help mitigate the risk of unauthorized access and malicious exploitation.

The systems and methods ensure that even if a virtual memory region is compromised, the transient nature of the data and code distribution confounds potential attackers-thereby fortifying the data against breaches. This innovative solution not only bolsters the security posture of computing environments, but is also able to adapt to various operational scenarios providing a robust, flexible defense against emerging threats.

In one exemplary aspect, the techniques described herein relate to a method for migrating units of a program between virtual memory regions, including: dividing system virtual memory into a set of virtual memory regions; storing (1) program code including instructions in a set of code units and (2) program variables and data values in a set of data units, wherein the set of code units and the set of data units are spread across the set of virtual memory regions; in response to detecting that a trigger condition of a first security policy is satisfied, executing a transfer action of the first security policy, wherein the transfer action includes: copying contents of a code unit and/or a data unit associated with the first security policy from an origin virtual memory region to a destination virtual memory region in the set of virtual memory regions; removing the contents of the code unit and/or the data unit from the origin virtual memory region; and updating a pointer and/or reference of the code unit and/or the data unit to reflect a new storage location in the destination virtual memory region.

In some aspects, the techniques described herein relate to a method, wherein each virtual memory region of the set of virtual memory regions is either empty, stores one of the set of data units, or stores one of the set of code units.

In some aspects, the techniques described herein relate to a method, further including configuring the first security policy based on system activity and virtual memory usage patterns on a computing device with the system virtual memory.

In some aspects, the techniques described herein relate to a method, wherein the set of data units and the set of code units belong to a program running on a computing device with the system virtual memory, wherein the transfer action is executed while the program is running.

In some aspects, the techniques described herein relate to a method, wherein the trigger condition is that an indication is received marking the contents of the code unit and/or the data unit as important.

In some aspects, the techniques described herein relate to a method, wherein the trigger condition is related to the access and transfer patterns of the code unit and/or the data unit. These conditions include:

- The code unit and/or the data unit being accessed a threshold number of times within a period of time.
- The code unit and/or the data unit being accessed at a specific time of day.
- The code unit and/or the data unit being accessed in a particular usage pattern.
- The code unit and/or the data unit being transferred at a particular frequency, where the transfer action is executed in accordance with this frequency.

In some aspects, the techniques described herein relate to a method, wherein the trigger condition is associated with the location and security status of the code unit and/or the data unit. These conditions include:

- The code unit and/or the data unit residing in the origin virtual memory region for more than a threshold period of time.
- The detection of a security threat on a computing device with the system virtual memory.
- The occurrence of fewer than a threshold number of transfers over a specified period of time.

In some aspects, the techniques described herein relate to a method, wherein the trigger condition is that a transfer time for moving all units in the set of virtual memory regions has arrived.

In some aspects, the techniques described herein relate to a method, wherein the trigger condition is one of: (1) a computing device with the system virtual memory being rebooted; (2) a program including the set of data units and the set of code units is started or terminated; and (3) a different program that does not include the set of data units and the set of code units is started or terminated while the program is running.

In some aspects, the techniques described herein relate to a method, wherein the first security policy is assigned to the code unit and/or the data unit, and a second security policy is assigned to a different code unit and/or a different data unit of the set of code units and the set of data units.

In some aspects, the techniques described herein relate to a method, wherein the first security policy is included in a set of security policies associated with a program including the set of code units and the set of data units, and wherein a different set of security policies is associated with a different program that does not include the set of code units and the set of data units.

In some aspects, the techniques described herein relate to a method, wherein executing the transfer action includes identifying an empty virtual memory region as the destination virtual memory region.

In some aspects, the techniques described herein relate to a method, wherein executing the transfer action includes identifying a specific virtual memory region as the destination virtual memory region in response to determining that the first security policy indicates a transfer pattern including a sequence of virtual memory regions in the set of virtual memory regions and that the specific virtual memory region is the next virtual memory region in the sequence.

In some aspects, the techniques described herein relate to a method, wherein executing the transfer action further includes: detecting preexisting content in the destination virtual memory region; and transferring the preexisting content to an empty virtual memory region prior to executing the transfer action.

It should be noted that the methods described above may be implemented in a system comprising a hardware processor. Alternatively, the methods may be implemented using computer executable instructions of a non-transitory computer readable medium.

In some aspects, the techniques described herein relate to a system for migrating units of a program between virtual memory regions, including: at least one virtual memory; at least one hardware processor coupled with the at least one virtual memory and configured, individually or in combination, to: divide the at least one virtual memory into a set of virtual memory regions; store (1) program code including instructions in a set of code units and (2) program variables and data values in a set of data units, wherein the set of code units and the set of data units are spread across the set of virtual memory regions; in response to detecting that a trigger condition of a first security policy is satisfied, execute a transfer action of the first security policy, wherein the transfer action includes: copying contents of a code unit and/or a data unit associated with the first security policy from an origin virtual memory region to a destination virtual memory region in the set of virtual memory regions; removing the contents of the code unit and/or the data unit from the origin virtual memory region; and updating a pointer and/or reference of the code unit and/or the data unit to reflect a new storage location in the destination virtual memory region.

In some aspects, the techniques described herein relate to a non-transitory computer readable medium storing thereon computer executable instructions for migrating units of a program between virtual memory regions, including instructions for: dividing system virtual memory into a set of virtual memory regions; storing (1) program code including instructions in a set of code units and (2) program variables and data values in a set of data units, wherein the set of code units and the set of data units are spread across the set of virtual memory regions; in response to detecting that a trigger condition of a first security policy is satisfied, executing a transfer action of the first security policy, wherein the transfer action includes: copying contents of a code unit and/or a data unit associated with the first security policy from an origin virtual memory region to a destination virtual memory region in the set of virtual memory regions; removing the contents of the code unit and/or the data unit from the origin virtual memory region; and updating a pointer and/or reference of the code unit and/or the data unit to reflect a new storage location in the destination virtual memory region.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for migrating code units and data units between virtual memory regions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
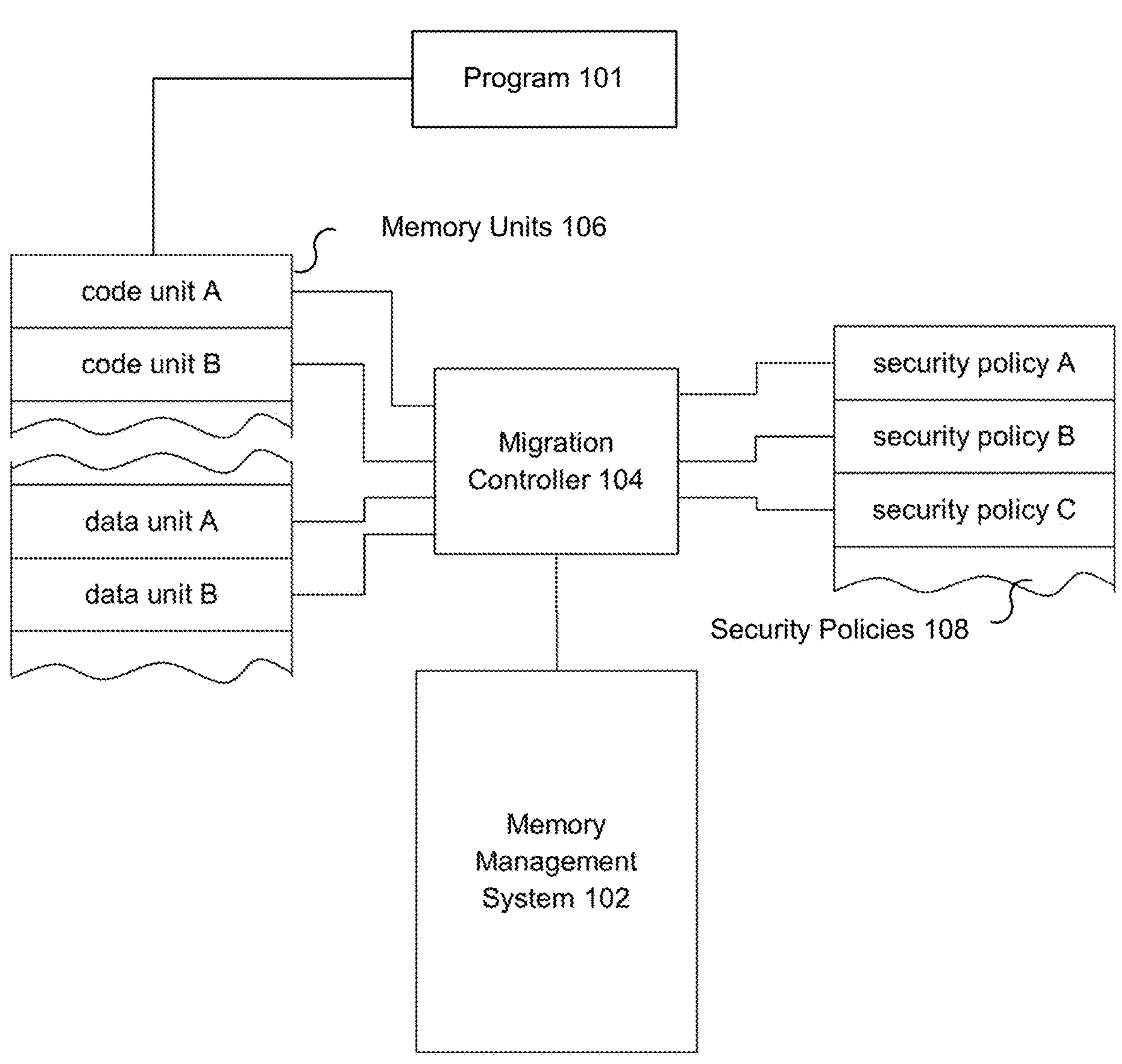
FIG. 1 is a block diagram illustrating a system for migrating code units and data units between virtual memory regions.

FIG. 1 is a block diagram illustrating system 100 for migrating code units and data units between virtual memory regions. System 100 includes virtual memory management system 102, which may be executed by computer system 20 (described in FIG. 5). System 100 further includes migration controller 104, which accesses virtual memory units 106 and security policies 108.

In some aspects, virtual memory units 106 may belong to a particular program 101 that is executed by computer system 20. The virtual memory of program 101 is divided into multiple units of code (executable instructions) and data (information or variables). As shown in FIG. 1, for example, virtual memory units 106 of the program includes code unit A, code unit B, data unit A, and data unit B. Only two of each type of unit is shown in FIG. 1 for simplicity, but one skilled in the art will appreciate that virtual memory units 106 may include any number of code or data units depending on the program.

In some aspects, migration controller 104 may be implemented as a part of a program, as a separate process, or as a combination of these options, and is responsible for orchestrating the movement of code units and data units. Migration controller 104 operates at a low level, interacting with the virtual memory management system 102 and program 101. The migration process is governed by predefined security policies 108 that determine the frequency, timing, and pattern of migration. These policies 108 are generated and configured by migration controller 104 based on the security requirements of the system running program 101.

In an exemplary aspect, the migration process may involve initiation, selection of units, optional backup, transfer of units, and virtual memory scrubbing steps. Migration controller 104 initiates the migration process based on triggers, which can include specific time intervals, detected threats, or random intervals to introduce unpredictability. Code units and data units to be migrated are selected based on their sensitivity, usage patterns, and current virtual memory location.

In some aspects, critical or frequently accessed units may have different migration patterns compared to less critical ones. Before migration, in some aspects, migration controller 104 may perform a backup of the selected units to ensure data integrity. For example, the units may be stored in a cloud storage. Subsequently, migration controller 104 may transfer the units to new virtual memory regions. This involves copying the content, updating pointers, and ensuring that the system's execution flow remains uninterrupted. After migration, the old virtual memory regions are scrubbed to eliminate remnants of the migrated units, thwarting potential virtual memory forensics.

Migration controller 104 refers to security policies 108 in order to orchestrate transfers. A security policy may include two portions—a trigger and a transfer action. In response to detecting that a trigger has been satisfied, migration controller 104 executes the transfer action. Example triggers may include but are not limited to:

(1) A unit is identified as critical
(2) A unit is accessed a threshold number of times within a period of time (e.g., accessed frequently)
(3) A unit is accessed at a particular time of the day
(4) A unit is accessed at a particular pattern (e.g., one time on a first day, two times on a second day, three times on a third day, etc.)
(5) A unit is located at a certain virtual memory location for a threshold amount of time
(6) A security threat is detected
(7) A transfer time requiring units to be randomly transferred is met
(8) A unit is required to be moved at a particular frequency (e.g., every 4 hours)
(9) A threshold number of units have been transferred
(10) No other units have been transferred for at least a threshold period of time
(11) Computer system running program 101 is restarted
(12) Program 101 is restarted
(13) Program 101 is exited
(14) A different program is started while program 101 is closed
(15) A different program is started while program 101 is running In some aspects, certain security policies may be assigned to particular units. For example, data unit A may be assigned security policy A, which has trigger (3). For example, if data unit A is accessed between 2:00 pm and 3:00 pm by a user, the data unit A is selected for a transfer. If the data unit A is not accessed during that particular time, it is not selected for a transfer. In another example, code unit B may be assigned security policy B, which has trigger (4). Accordingly, in order to be a candidate for transfer, code unit B needs to be accessed in a particular pattern (e.g., at a particular time, a particular number of times, by certain users/devices, etc.). Only when the access pattern is detected is code unit B transferred. In yet another example, data unit B may be assigned security policy C, which may have trigger (5). For example, if data unit B spends more than 12 hours in a particular location of virtual memory, it needs to be moved to a new location.

In some aspects, a security policy may be applied to multiple units or all units. For example, a security policy with trigger (7) may cause all units to be shifted around when a transfer time (e.g., Jan. 1, 2025 12:00 am) arrives.

In terms of transfer actions, a security policy may indicate where a unit needs to be transferred. For example, a transfer action may involve moving a unit to any virtual memory location that does not hold any other unit (e.g., a free space). In some aspects, a transfer action may indicate that the unit needs to be swapped with any other unit. In some aspects, a transfer action may indicate that the unit needs to be swapped with a particular unit. In some aspects, a transfer action may indicate that the unit needs to be transferred with a particular delay (e.g., 1 hour after trigger (6)). In some aspects, a transfer action may indicate a particular movement pattern for a unit. For example, if there are 8 possible regions (e.g., 1-8) where the unit may exist, the pattern may be [8, 1, 2, 3, 5, 8, 1, 7, 6]. In this case, the unit starts at region 8, when a trigger condition is met, the unit is moved to region 1. When the trigger condition is met again, the unit is moved to region 2. When the trigger condition is met again, the unit is moved to region 3, and so on. Accordingly, migration controller 102 may track where the units are located and retain virtual memory of where they have been and where they will go. In some aspects, multiple units may have different movement patterns. To prevent any overlap (e.g., two units being assigned the same destination region), migration controller 104 may review each transfer pattern and update the patterns to prevent units from being assigned the same destination region. In some aspects, this updating occurs whenever a transfer occurs. In the event that two units are somehow assigned the same destination region, migration controller 104 may determine which unit has its trigger condition met first (based on timestamps), assign said unit the destination region, and assign a different destination region to the other unit(s).

Due to the dynamically changing virtual memory layout, a major security advantage of system 100 includes an increased complexity for attackers attempting to locate and exploit vulnerabilities in code or extract sensitive data. The constant movement of code and data reduces the window of opportunity for attacks that rely on static virtual memory addresses. The migration policies may also be adapted on demand based on threat intelligence, making the system responsive to emerging security threats.

Figure 2:
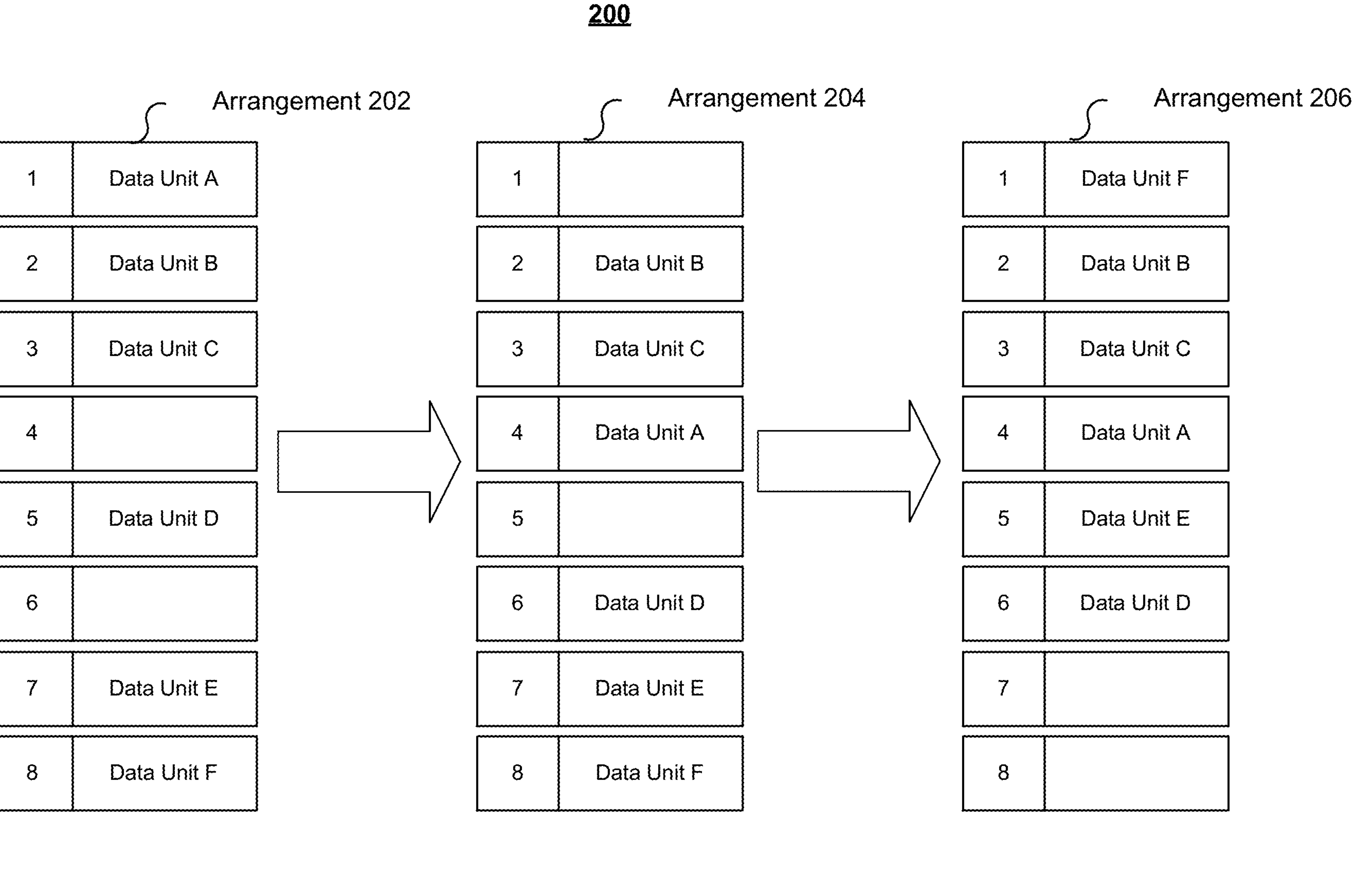
FIG. 2 is a diagram illustrating an example of data unit arrangements.

FIG. 2 is a diagram illustrating an example 200 of data unit arrangements. Arrangement 202 may be an initial set up of data units in virtual memory units 106. Data units A-F may be dispersed over 8 virtual memory regions. In response to detecting a first migration trigger (e.g., indicated by security policy A) migration controller 104 may select data unit A and transfer the unit from region 1 to region 4. Migration controller 104 may then scrub region 1. Migration controller 104 may further select data unit D and transfer the unit from region 5 to region 6. Migration controller 104 may then scrub region 5. The new positions are shown in arrangement 204.

In response to detecting a second migration trigger (e.g., indicated by security policy B), migration controller 104 may select data unit F and transfer the unit from region 8 to region 1. Migration controller 104 may then scrub region 8. Migration controller 104 may further select data unit E and transfer the unit from region 7 to region 5. Migration controller 104 may then scrub region 7. The new positions are shown in arrangement 206.

It should be noted that migration controller 104 updates pointers and references to reflect the new locations of the data units in each arrangement.

Figure 3:
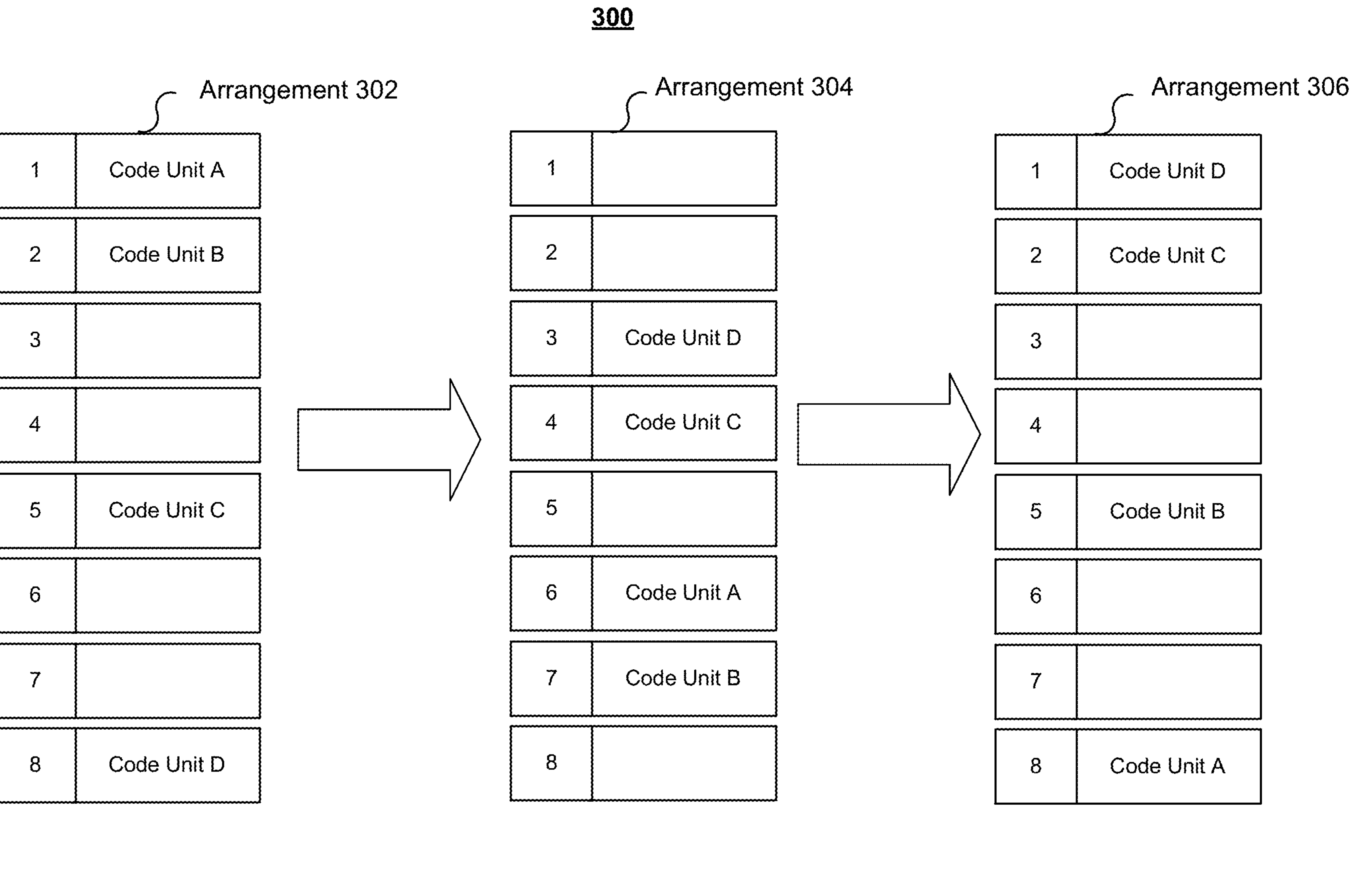
FIG. 3 is a diagram illustrating an example of code unit arrangements.

FIG. 3 is a diagram illustrating an example 300 of code unit arrangements. Example 300 is an example in which during each trigger, all code units are transferred without prejudice. Arrangement 302 may be an initial set up of code units in virtual memory units 106. Code units A-D may be dispersed over 8 virtual memory regions.

In response to detecting a first migration trigger (e.g., indicated by security policy A) migration controller 104 may select code unit A and transfer the unit from region 1 to region 6. Migration controller 104 may then scrub region 1. Migration controller 104 may further select code unit B and transfer the unit from region 2 to region 7. Migration controller 104 may then scrub region 2. Migration controller 104 may further select code unit C and transfer the unit from region 5 to region 4. Migration controller 104 may then scrub region 5. Migration controller 104 may further select code unit D and transfer the unit from region 8 to region 3. Migration controller 104 may then scrub region 8. The new positions are shown in arrangement 304.

In response to detecting a second migration trigger (e.g., indicated by security policy B) migration controller 104 may select code unit A and transfer the unit from region 6 to region 8. Migration controller 104 may then scrub region 6. Migration controller 104 may further select code unit B and transfer the unit from region 7 to region 5. Migration controller 104 may then scrub region 7. Migration controller 104 may further select code unit C and transfer the unit from region 4 to region 2. Migration controller 104 may then scrub region 4. Migration controller 104 may further select code unit D and transfer the unit from region 3 to region 1. Migration controller 104 may then scrub region 3. The new positions are shown in arrangement 306.

It should be noted that migration controller 104 updates pointers and references to reflect the new locations of the code units in each arrangement.

Figure 4:
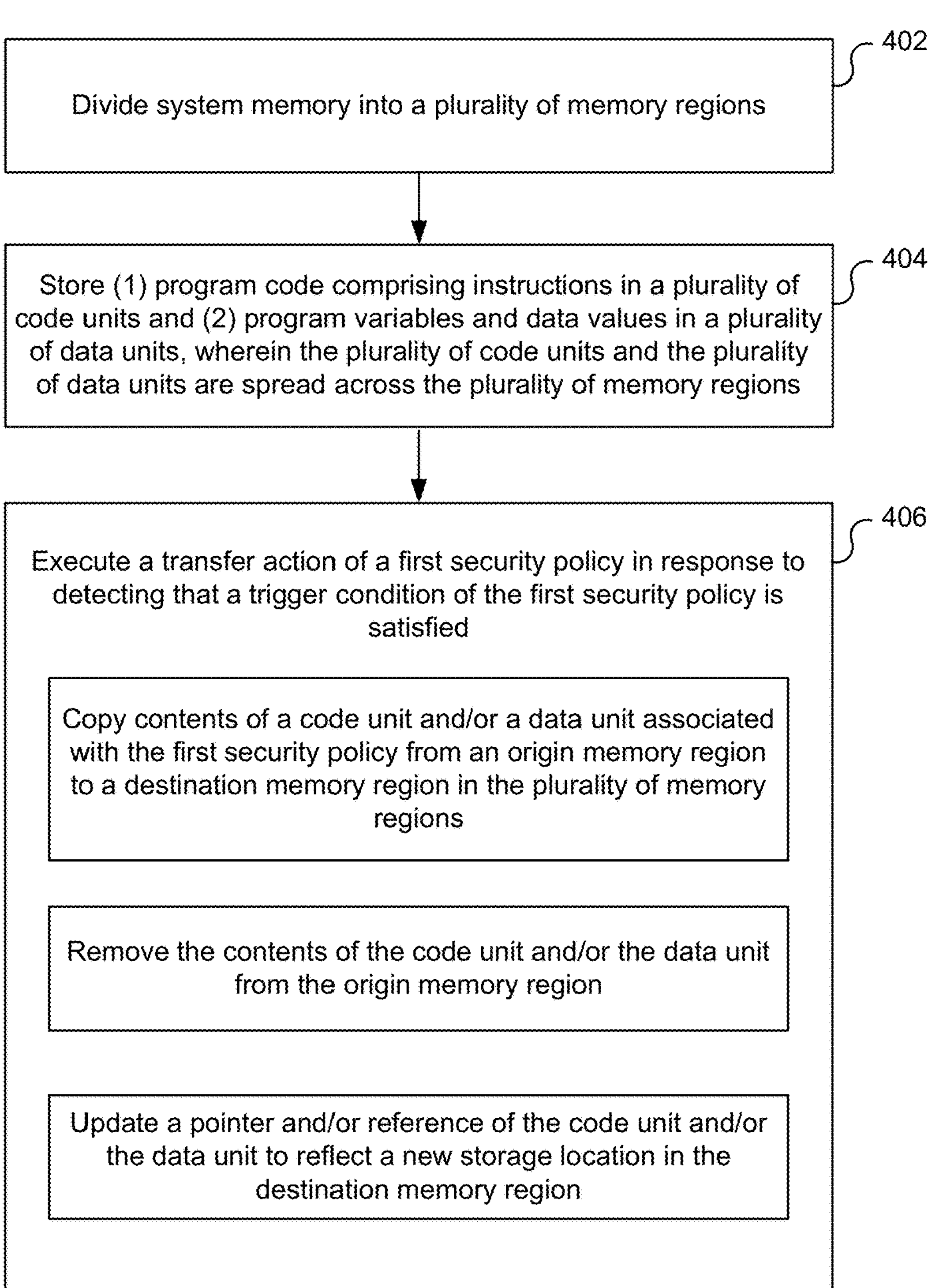
FIG. 4 illustrates a flow diagram of a method for migrating code units and data units between virtual memory regions.

FIG. 4 illustrates a flow diagram of method 400 for migrating code units and data units between virtual memory regions. At 402, migration controller 104 divides system virtual memory into a set of virtual memory regions (e.g., defines where each region ends and starts in the system virtual memory).

At 404, migration controller 104 stores (1) program code comprising instructions in a set of code units and (2) program variables and data values in a set of data units, wherein the set of code units and the set of data units are spread across the set of virtual memory regions. In some aspects, each virtual memory region of the set of virtual memory regions is either empty, stores one of the set of data units, or stores one of the set of code units.

At 406, in response to detecting that a trigger condition of a first security policy is satisfied, migration controller 104 executes a transfer action of the first security policy. In some aspects, migration controller 104 configures the first security policy based on system activity and virtual memory usage patterns on a computing device with the system virtual memory.

In some aspects, the first security policy is assigned to the code unit and/or the data unit, and a second security policy is assigned to a different code unit and/or a different data unit of the set of code units and the set of data units.

In some aspects, the first security policy is comprised in a set of security policies (e.g., security policies A and B) associated with a program comprising the set of code units and the set of data units, and wherein a different set of security policies (e.g., security policies C and B) is associated with a different program that does not comprise the set of code units and the set of data units.

In some aspects, the trigger condition is one of:

(1) the code unit and/or the data unit is accessed a threshold number of times within a period of time;
(2) the code unit and/or the data unit is accessed at a particular time of day;
(3) the code unit and/or the data unit is accessed in a particular usage pattern; and
(4) the code unit and/or the data unit is transferred at a particular frequency and a time associated with executing the transfer action has occurred in accordance with the particular frequency;
(5) the code unit and/or the data unit is located in the origin virtual memory region for more than a threshold period of time;
(6) a security threat is detected on a computing device with the system virtual memory;
(7) less than a threshold number of transfers have been performed over a period of time;
(8) a transfer time for moving all units in the set of virtual memory regions has arrived;
(9) a computing device with the system virtual memory being rebooted;
(10) a program comprising the set of data units and the set of code units is started or terminated;
(11) a different program that does not comprise the set of data units and the set of code units is started or terminated while the program is running;
(12) an indication is received marking the contents of the code unit and/or the data unit as important.

The transfer action involves migration controller 104 copying contents of a code unit and/or a data unit associated with the first security policy from an origin virtual memory region to a destination virtual memory region in the set of virtual memory regions. The transfer action further involves migration controller 104 removing the contents of the code unit and/or the data unit from the origin virtual memory region, and updating a pointer and/or reference of the code unit and/or the data unit to reflect a new storage location in the destination virtual memory region.

In some aspects, the set of data units and the set of code units belong to a program running on a computing device with the system virtual memory, wherein the transfer action is executed while the program is running.

In some aspects, migration controller 104 executes the transfer action comprises identifying an empty virtual memory region as the destination virtual memory region.

In some aspects, migration controller 104 executes the transfer action by identifying a specific virtual memory region as the destination virtual memory region in response to determining that the first security policy indicates a transfer pattern comprising a sequence of virtual memory regions in the set of virtual memory regions and that the specific virtual memory region is the next virtual memory region in the sequence.

In some aspects, migration controller 104 executes the transfer action by detecting preexisting content in the destination virtual memory region, and transferring the preexisting content to an empty virtual memory region prior to executing the transfer action. In some aspects, if the size of the virtual memory region is a multiple of the virtual memory page size, the new page table entry may be created to map existing physical memory into a different virtual address without actually needing to move data between memory regions (i.e., move content within virtual memory without moving it in physical memory).

Figure 5:
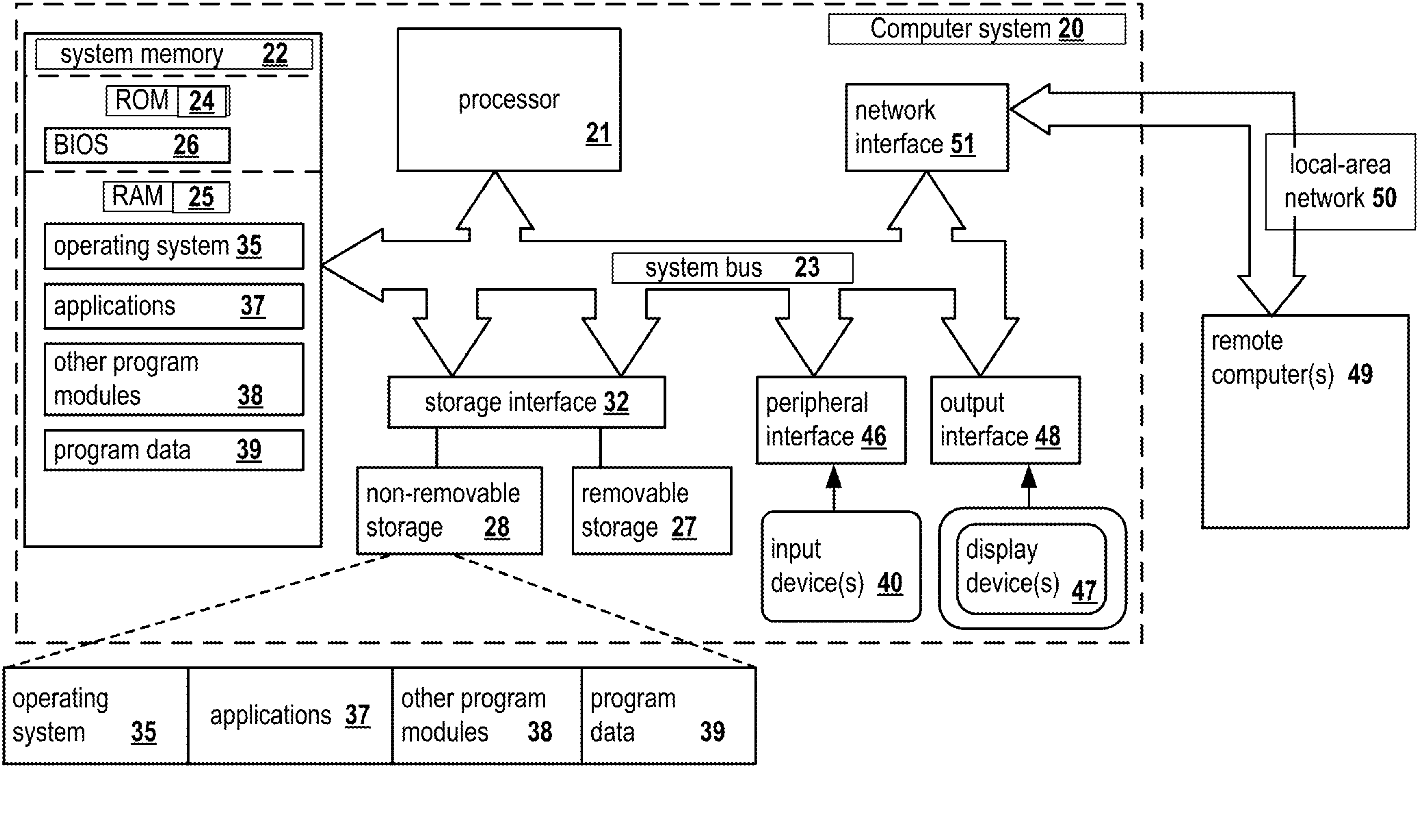
FIG. 5 presents an example of a general-purpose computer system on which aspects of the present disclosure can be implemented.

FIG. 5 is a block diagram illustrating a computer system 20 on which aspects of systems and methods for migrating code units and data units between virtual memory regions may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system virtual memory 22, and a system bus 23 connecting the various system components, including the virtual memory associated with the central processing unit 21. The system bus 23 may comprise a bus virtual memory or bus virtual memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system virtual memory 22 may be any virtual memory for storing data used herein and/or computer programs that are executable by the processor 21. The system virtual memory 22 may include volatile virtual memory such as a random access virtual memory (RAM) 25 and non-volatile virtual memory such as a read only virtual memory (ROM) 24, flash virtual memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system virtual memory 22, removable storage devices 27, and non-removable storage devices 28 may use a variety of computer-readable storage media. Examples of computer-readable storage media include machine virtual memory such as cache, SRAM, DRAM, zero capacitor RAM, twin transistor RAM, eDRAM, EDO RAM, DDR RAM, EEPROM, NRAM, RRAM, SONOS, PRAM; flash virtual memory or other virtual memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system virtual memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access virtual memory (RAM), a read-only virtual memory (ROM), EEPROM, a portable compact disc read-only virtual memory (CD-ROM), a digital versatile disk (DVD), flash virtual memory, a hard disk, a portable computer diskette, a virtual memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for migrating units of a program between virtual memory regions, comprising:

dividing system virtual memory into a set of virtual memory regions;

storing program code comprising instructions in a set of code units and program variables and data values in a set of data units, wherein the set of code units and the set of data units are spread across the set of virtual memory regions;

in response to detecting that a trigger condition of a first security policy is satisfied, executing a transfer action of the first security policy, including identifying a specific virtual memory region as the destination virtual memory region in response to determining that the first security policy indicates a transfer pattern comprising a sequence of virtual memory regions in the set of virtual memory regions and that the specific virtual memory region is the next virtual memory region in the sequence, and wherein the transfer action comprises:

copying contents of a code unit or a data unit associated with the first security policy from an origin virtual memory region to a destination virtual memory region in the set of virtual memory regions;

removing the contents of the code unit or the data unit from the origin virtual memory region; and updating a pointer or reference of the code unit or the data unit to reflect a new storage location in the destination virtual memory region.

2. The method of claim 1, wherein each virtual memory region of the set of virtual memory regions is either empty, stores one of the set of data units, or stores one of the set of code units.

3. The method of claim 1, further comprising configuring the first security policy based on system activity and virtual memory usage patterns on a computing device with the system virtual memory.

4. The method of claim 1, wherein the set of data units and the set of code units belong to a program running on a computing device with the system virtual memory, wherein the transfer action is executed while the program is running.

5. The method of claim 1, wherein the trigger condition is that an indication is received marking the contents of the code unit and/or the data unit as important.

6. The method of claim 1, wherein the trigger condition is one of:
(1) the code unit and/or the data unit is accessed a threshold number of times within a period of time;
(2) the code unit and/or the data unit is accessed at a particular time of day;
(3) the code unit and/or the data unit is accessed in a particular usage pattern; and
(4)) the code unit and/or the data unit is transferred at a particular frequency and a time associated with executing the transfer action has occurred in accordance with the particular frequency.

7. The method of claim 1, wherein the trigger condition is one of:
(1) the code unit and/or the data unit is located in the origin virtual memory region for more than a threshold period of time;
(2) a security threat is detected on a computing device with the system virtual memory; and
(3) less than a threshold number of transfers have been performed over a period of time.

8. The method of claim 1, wherein the trigger condition is that a transfer time for moving all units in the set of virtual memory regions has arrived.

9. The method of claim 1, wherein the trigger condition is one of:
(1) a computing device with the system virtual memory being rebooted;
(2) a program comprising the set of data units and the set of code units is started or terminated; and
(3) a different program that does not comprise the set of data units and the set of code units is started or terminated while the program is running.

10. The method of claim 1, wherein the first security policy is assigned to the code unit and/or the data unit, and a second security policy is assigned to a different code unit and/or a different data unit of the set of code units and the set of data units.

11. The method of claim 1, wherein the first security policy is comprised in a set of security policies associated with a program comprising the set of code units and the set of data units, and wherein a different set of security policies is associated with a different program that does not comprise the set of code units and the set of data units.

12. The method of claim 1, wherein executing the transfer action comprises identifying an empty virtual memory region as the destination virtual memory region.

13. The method of claim 1, wherein executing the transfer action further comprises:
detecting preexisting content in the destination virtual memory region; and
transferring the preexisting content to an empty virtual memory region prior to executing the transfer action.

14. A system for migrating units of a program between virtual memory regions, comprising:
at least one virtual memory;
at least one hardware processor coupled with the at least one virtual memory and configured, individually or in combination, to:
divide the at least one virtual memory into a set of virtual memory regions;
store program code comprising instructions in a set of code units and program variables and data values in a set of data units, wherein the set of code units and the set of data units are spread across the set of virtual memory regions;
in response to detecting that a trigger condition of a first security policy is satisfied, execute a transfer action of the first security policy, including identifying a specific virtual memory region as the destination virtual memory region in response to determining that the first security policy indicates a transfer pattern comprising a sequence of virtual memory regions in the set of virtual memory regions and that the specific virtual memory region is the next virtual memory region in the sequence, wherein the transfer action comprises:
copying contents of a code unit or a data unit associated with the first security policy from an origin virtual memory region to a destination virtual memory region in the set of virtual memory regions;
removing the contents of the code unit or the data unit from the origin virtual memory region; and
updating a pointer or reference of the code unit or the data unit to reflect a new storage location in the destination virtual memory region.

15. The system of claim 14, wherein each virtual memory region of the set of virtual memory regions is either empty, stores one of the set of data units, or stores one of the set of code units.

16. The system of claim 14, wherein the at least one hardware processor is configured to configure the first security policy based on system activity and virtual memory usage patterns on a computing device with the at least one virtual memory.

17. The system of claim 14, wherein the set of data units and the set of code units belong to a program running on a computing device with the at least one virtual memory, wherein the transfer action is executed while the program is running.

18. The system of claim 14, wherein the trigger condition is that an indication is received marking the contents of the code unit and/or the data unit as important.

19. A non-transitory computer readable medium storing thereon computer executable instructions for migrating units of a program between virtual memory regions, including instructions for:
dividing system virtual memory into a set of virtual memory regions;
storing program code comprising instructions in a set of code units and program variables and data values in a set of data units, wherein the set of code units and the set of data units are spread across the set of virtual memory regions;
in response to detecting that a trigger condition of a first security policy is satisfied, executing a transfer action of the first security policy, including identifying a specific virtual memory region as the destination virtual memory region in response to determining that the first security policy indicates a transfer pattern comprising a sequence of virtual memory regions in the set of virtual memory regions and that the specific virtual memory region is the next virtual memory region in the sequence, wherein the transfer action comprises:
copying contents of a code unit or a data unit associated with the first security policy from an origin virtual memory region to a destination virtual memory region in the set of virtual memory regions;
removing the contents of the code unit or the data unit from the origin virtual memory region; and updating a pointer or reference of the code unit or the data unit to reflect a new storage location in the destination virtual memory region.

* * * * *